US 9,298,449 B2

(12) United States Patent
Tsirkin

(10) Patent No.: US 9,298,449 B2
(45) Date of Patent: Mar. 29, 2016

(54) COMPOSITE PROGRAM HISTORY

(71) Applicant: Michael Tsirkin, Yokneam Yillit (IL)

(72) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 282 days.

(21) Appl. No.: 13/830,893

(22) Filed: Mar. 14, 2013

(65) Prior Publication Data

US 2014/0282401 A1    Sep. 18, 2014

(51) Int. Cl.
*G06F 9/44*    (2006.01)

(52) U.S. Cl.
CPC ........................................ *G06F 8/71* (2013.01)

(58) Field of Classification Search
IPC .... G06F 8/24,8/65, 8/71, 8/76, 17/30569; Y10S 707/99954, 707/99945, 707/99953
See application file for complete search history.

(56) References Cited

U.S. PATENT DOCUMENTS

| | | | |
|---|---|---|---|
| 5,649,200 A * | 7/1997 | Leblang et al. | 717/122 |
| 5,983,242 A * | 11/1999 | Brown et al. | |
| 2003/0093434 A1* | 5/2003 | Stickler | 707/103 R |
| 2005/0165760 A1* | 7/2005 | Seo | 707/3 |
| 2010/0083230 A1* | 4/2010 | Ramakrishnan et al. | 717/121 |
| 2013/0174124 A1* | 7/2013 | Watters et al. | 717/122 |
| 2014/0096121 A1* | 4/2014 | Joshi et al. | 717/170 |

* cited by examiner

*Primary Examiner* — Tuan Vu
(74) *Attorney, Agent, or Firm* — Lowenstein Sandler LLP

(57) ABSTRACT

A system and methods are disclosed for maintaining a composite history of changes to a program comprising two parallel histories. In accordance with one embodiment, a computer system identifies a first history of changes to a program, and generates a second history of changes to the program based on the first history, where the second history has a final version of the program that is identical to a final version of the program in the first history, and where the second history excludes changes to the program in the first history that introduce an error that is fixed in a subsequent change to the program in the first history, and where the second history includes all other changes to the program in the first history. The computer system then generates a third history of changes to the program that comprises the first history and the second history.

20 Claims, 4 Drawing Sheets

COMPOSITE PROGRAM HISTORY

TECHNICAL FIELD

This disclosure relates to computer systems, and more particularly, to managing a history of changes to a program.

BACKGROUND

Version control, also known as revision control or source control, is the management of changes to computer programs. Typically a version control system maintains a history of changes to a program so that it is possible to navigate forward or backward through the history to obtain a particular version of the program. Version control systems also typically enable different versions of a program to be compared, restored, or, in some cases, merged.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and methods for maintaining a composite history of changes to a program comprising two parallel histories. In accordance with one embodiment, a second, revised history of changes is generated based on a first, original history of changes to a program, such that the revised history omits versions of the program that introduced one or more bugs that were subsequently fixed in a later version—thereby avoiding the "embarrassment" and other negative consequences associated with buggy software.

A composite history is then constructed comprising both the original and revised histories, and requests to navigate forward in the history and navigate backward in the history are handled by the composite history. More particularly, in accordance with one example, backward requests (i.e., requests for a version of the program preceding a specified version) are handled by consulting the revised history. For the case of a forward request (i.e., a request for a version of the program that comes after a specified version), the portion of the original history from the initial version to the specified version is compared to the portion of the revised history from the initial version to the specified version. If the portions are not identical, then the forward request is handled by consulting the original history; otherwise, the forward request is handled by consulting the revised history.

Embodiments of the present disclosure thus provide a mechanism for maintaining a composite history of changes to a program, where the composite history can facilitate the hiding of buggy versions, without preventing access to these buggy versions when necessary. By handling requests to navigate forward and backward through a program's history via either the original history or the revised history, as appropriate, the embarrassment and other negative consequences (e.g., blemished reputation, lost software sales, a drop in stock price, etc.) that can occur as a result of buggy software can be diminished.

Figure 1:
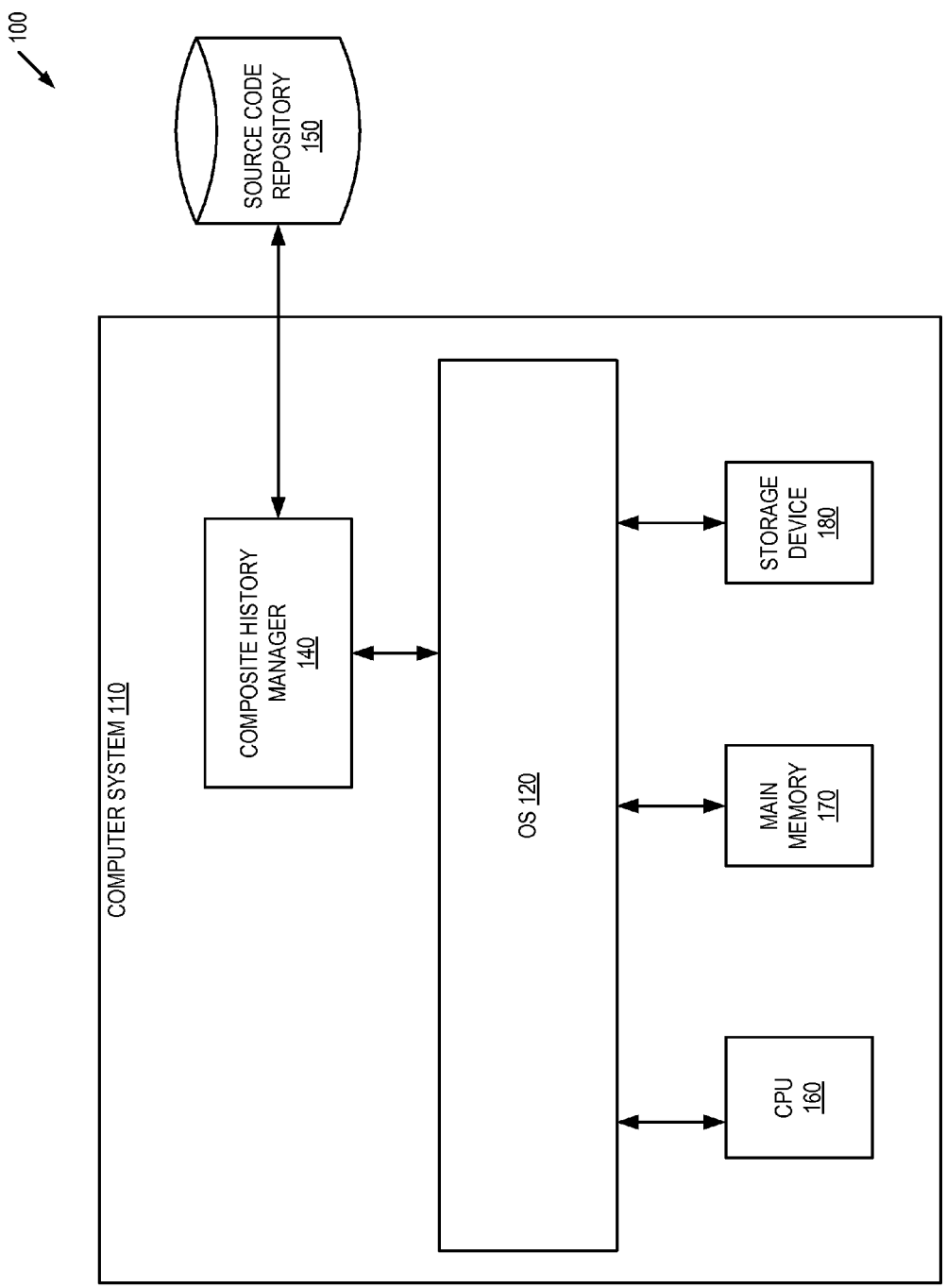
FIG. 1 depicts an exemplary computer system architecture, in accordance with an embodiment of the present invention.

FIG. 1 depicts an illustrative architecture of a system 100, in accordance with an example of the present invention. It should be noted that other architectures for system 100 are possible, and that examples of a system utilizing the disclosure are not necessarily limited to the specific architecture depicted by FIG. 1.

As shown in FIG. 1, system 100 comprises a computer system 110 and a source code repository 150. Computer system 110 may be a server, a mainframe, a workstation, a personal computer (PC), a mobile phone, a palm-sized computing device, etc. Source code repository 150 may be a file server, a database system, etc. that stores different versions of program source code and is accessible to computer system 110 (e.g., via a network, etc.). In one embodiment, computer system 110 comprises a central processing unit (CPU) 160, a main memory 170 (e.g., random access memory (RAM), flash memory, etc.), and a storage device 180 (e.g., one or more magnetic hard disk drives, one or more Universal Serial Bus [USB] solid-state drives, etc.). Central processing unit (CPU) 160 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Main memory 170 may include volatile memory devices (e.g., random access memory (RAM)), non-volatile memory devices (e.g., flash memory), and/or other types of memory devices. Storage device 180 may include a magnetic hard disk, a Universal Serial Bus [USB] solid state drive, a Redundant Array of Independent Disks [RAID] system, a network attached storage [NAS] array, etc.

It should be noted that in some alternative embodiments, source code repository 150 may be part of computer system 110 (e.g., stored on storage device 180, etc.), rather than external to computer system 110. It should further be noted that the fact that a single CPU is depicted in FIG. 1 is merely illustrative, and that in some other examples computer system 110 may comprise a plurality of CPUs.

Computer system 110 runs an operating system (OS) 120 that manages the hardware resources of the computer system and provides functions such as interprocess communication, scheduling, virtual memory management, and so forth. In one example, computer system 110 includes a composite history manager 140 that is capable of reading from and writing to source code repository 150, of maintaining a composite history of changes to a program, and of servicing requests pertaining to changes to a program. Some operations of source code repository 150 are described in detail below with respect to FIGS. 2 and 3.

Figure 2:
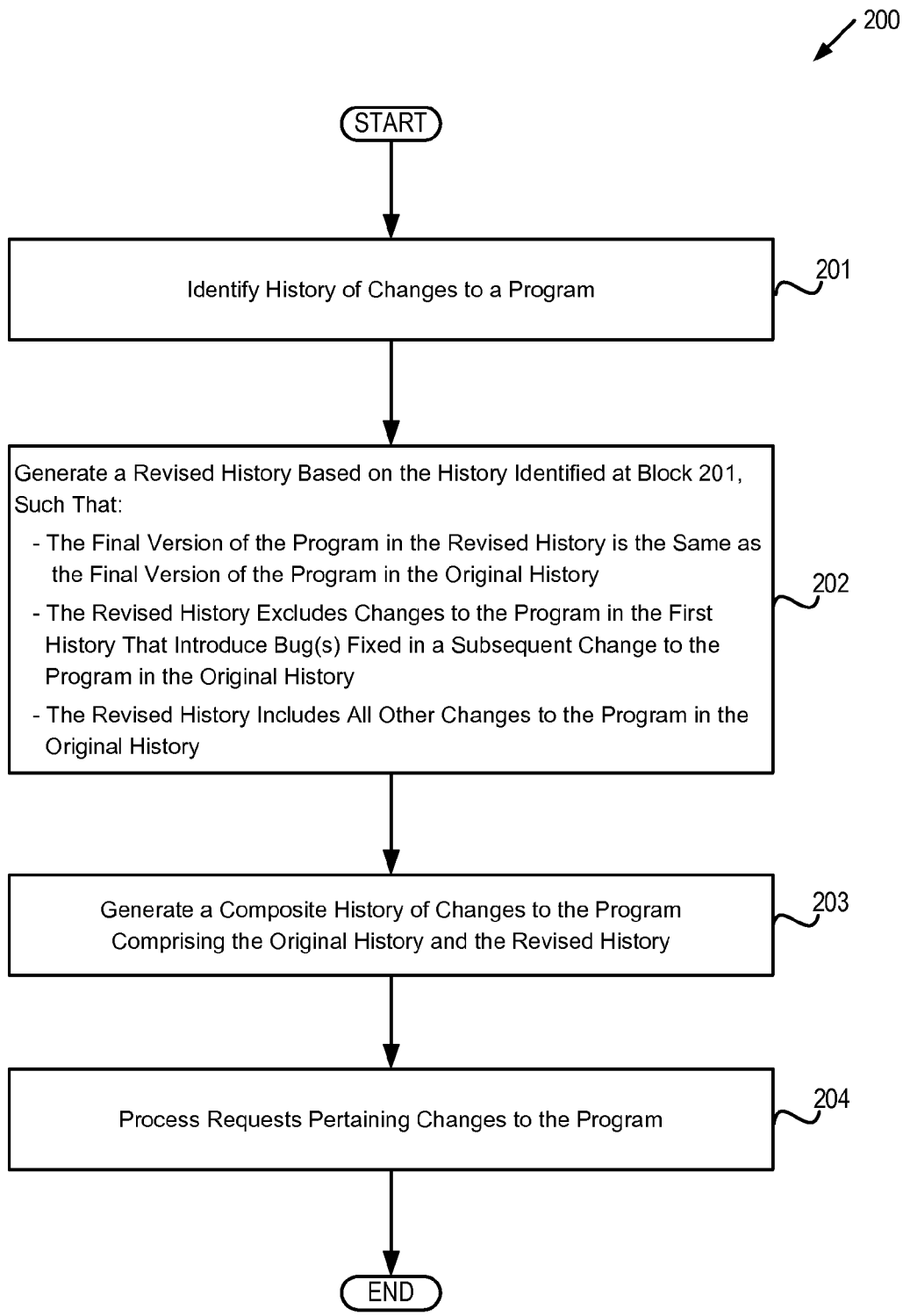
FIG. 2 depicts a flow diagram of an example of a method by which a computer system manages a history of changes to a program.

FIG. 2 depicts a flow diagram of an example of a method 200 by which a computer system manages a history of changes to a program. The method is performed by processing logic that may comprise hardware (circuitry, dedicated logic, etc.), software (such as is run on a general purpose computer system or a dedicated machine), or a combination of both. In one embodiment, the method is performed by the computer system 110 of FIG. 1, while in some other embodiments, some or all of the method may be performed by one or more other machines. Similarly, in one example the method is performed by composite history manager 140 of computer system 110, while in some other examples, some or all of the method might be performed by some other module of computer system 110. It should be noted that blocks depicted in FIG. 2 can be performed simultaneously or in a different order than that depicted.

At block 201, a history of changes to a program is identified. In some examples the history of changes is identified by composite history manager 140 and may be provided to composite history manager 140 as a parameter of a function call, while in some other examples the history of changes may be provided to composite history manager 140 by a programmer or administrator (e.g., via a shell script command, etc.), while in yet other examples the history of changes may be provided to composite history manager 140 in some other fashion.

At block 202, a revised history of changes to the program is generated based on the history of changes identified at block 201 (i.e., the "original history"). In one example, the revised history is intended to hide versions of the program that introduced errors ("bugs") that were later identified and fixed. More particularly, the revised history is generated such that:

the final version of the program in the revised history is the same as the final version of the program in the original history;

the revised history excludes changes to the program in the original history that introduce one or more bugs that were fixed in a subsequent version of the program in the original history; and the revised history includes all other changes to the program in the original history.

For example, if the original history consists of four versions of the program (i.e., a first version, a second version, a third version, and a fourth version), and the second version introduced a bug that was identified and fixed in the third version, then the revised history would consist of the first version, the third version, and the fourth version. In accordance with one example, the identification and fixing of bugs is indicated in a change log file that is stored in source code repository 150 and consulted by composite history manager 140.

At block 203, a composite history of changes to the program is generated, where the composite history comprises both the original history identified at block 201 and the revised history identified at block 202. In some examples, the composite history may be represented as a record (e.g., a struct in the C programming language, etc.), while in some other examples, the composite history may be represented as an object (e.g., a C++ object, a Java object, etc.) with the original history and revised history as member fields, while in yet other examples, the composite history may be represented in some other fashion. In accordance with one embodiment, block 203 is performed by composite history manager 140.

At block 204, requests pertaining to changes to the program (e.g., a request to get a version of the program that precedes a given version, a request to get a version of the program that comes after a given version, etc.) are processed using the composite history generated at block 203. An implementation of a method for performing block 204 is described in detail below with respect to FIG. 3.

Figure 3:
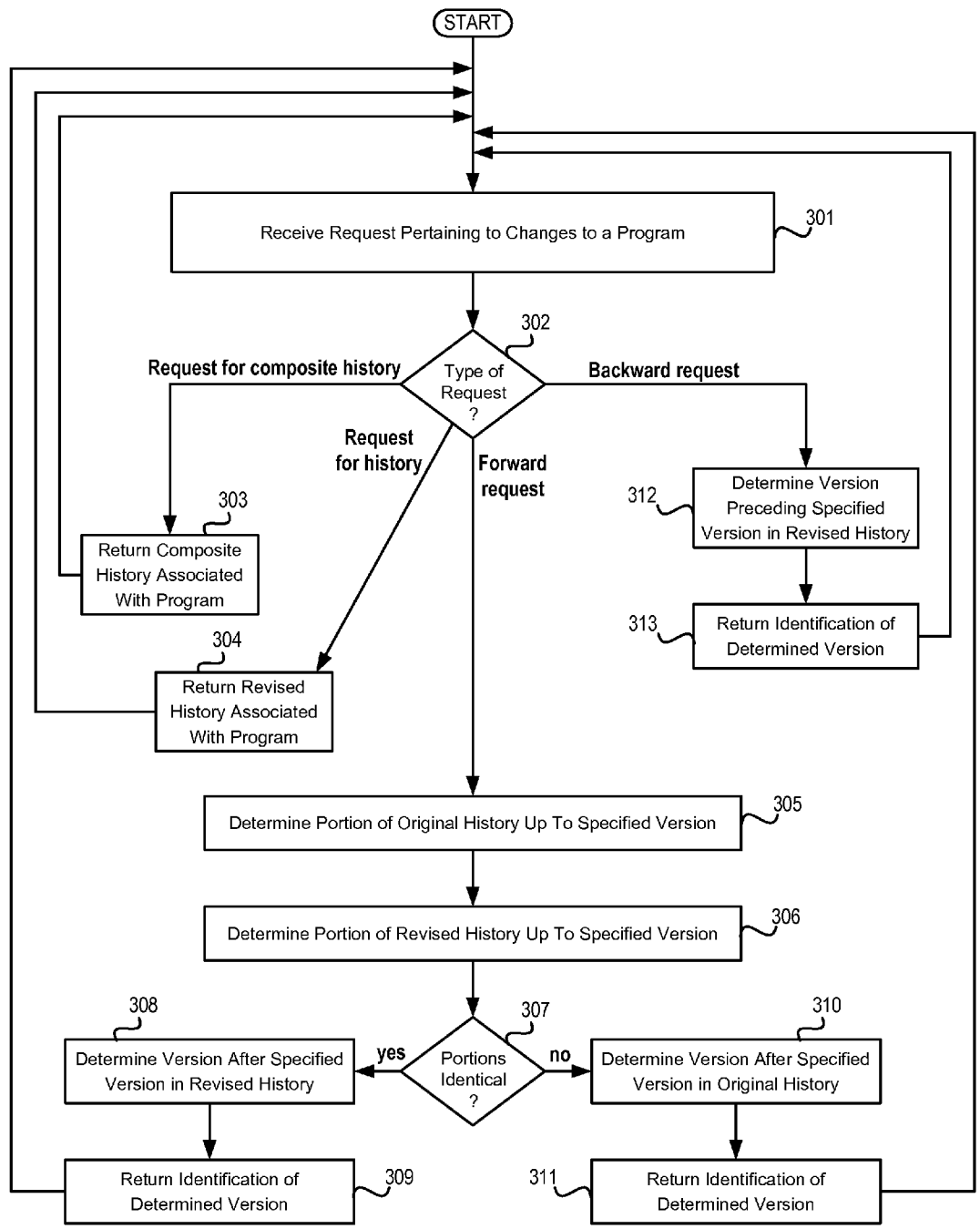
FIG. 3 depicts a flow diagram of an example of a method by which a computer system processes requests pertaining to changes to a program.

FIG. 3 depicts a flow diagram of an example of a method by which a computer system processes requests pertaining to changes to a program. The method is performed by processing logic that may comprise hardware (circuitry, dedicated logic, etc.), software (such as is run on a general purpose computer system or a dedicated machine), or a combination of both. In one embodiment, the method is performed by the computer system 110 of FIG. 1, while in some other embodiments, some or all of the method may be performed by one or more other machines. Similarly, in one example the method is performed by composite history manager 140 of computer system 110, while in some other examples, some or all of the method might be performed by some other module of computer system 110. It should be noted that blocks depicted in FIG. 3 can be performed simultaneously or in a different order than that depicted.

At block 301, a request pertaining to changes to a program is received. Block 302 branches based on the type of request: when the request is for a composite history of changes to the program, execution continues at block 303; when the request is for a history of changes to the program, execution continues at block 304; when the request specifies a particular version of the program and requests a version of the program that comes after the specified version (a "forward request"), execution continues at block 305; when the request specifies a particular version of the program and requests a version of the program that precedes the specified version (a "backward request"), execution continues at block 312.

At block 303, the composite history associated with the program (e.g., an object, a record, etc.) is returned to the sender of the request. In some examples, a reference (e.g., pointer, address, etc.) to the composite history is returned, while in some other examples, a copy of the composite history record/object is returned. After block 303, execution continues back at block 301.

At block 304, the revised history associated with the program (e.g., an object, a record, etc.) is returned to the sender of the request. In some examples, a reference (e.g., pointer, address, etc.) to the revised history within the composite history record/object is returned, while in some other examples, a copy of the revised history is returned. After block 304, execution continues back at block 301.

At block 305, the portion of the original history (which is contained in the composite history) prior to and including the specified version of the program is determined, and at block 306, the portion of the revised history (which is also contained in the composite history) prior to and including the specified version of the program is determined. Block 307 then checks whether the two portions are identical; if so, execution continues at block 308, otherwise execution continues at block 310.

At block 308, the version of the program that comes after the specified version in the revised history is determined, and at block 309, an identification of this version (e.g., a version number, a directory in source code repository 150, etc.) is returned to the sender of the request. After block 309, execution continues back at block 301.

At block 310, the version of the program that comes after the specified version in the original history is determined, and at block 311, an identification of this version (e.g., a version number, a directory in source code repository 150, etc.) is returned to the sender of the request. After block 311, execution continues back at block 301.

At block 312, the version of the program that precedes the specified version in the revised history is determined, and at block 313, an identification of this version (e.g., a version number, a directory in source code repository 150, etc.) is returned to the sender of the request. After block 312, execution continues back at block 301.

Figure 4:
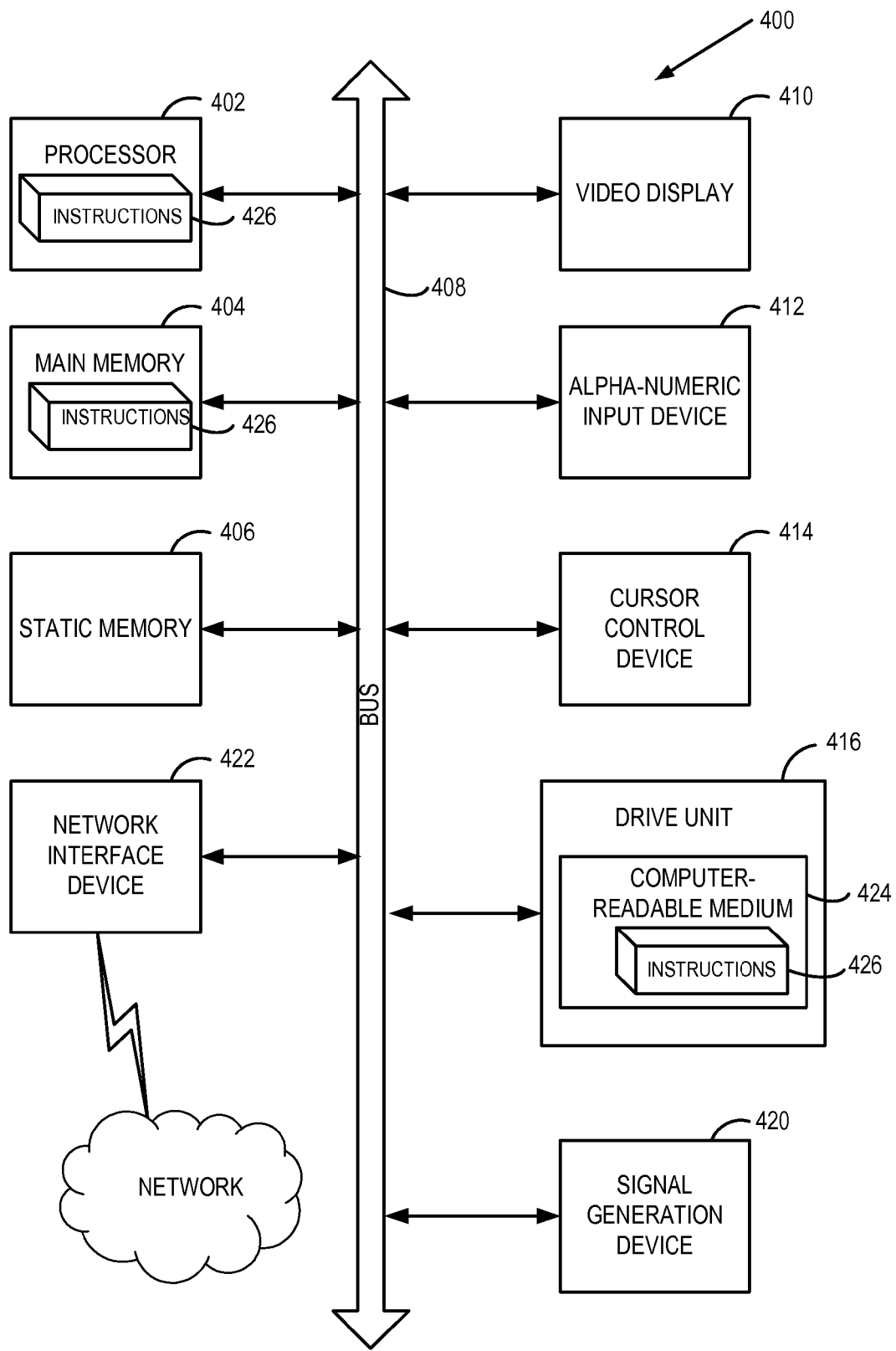
FIG. 4 depicts a block diagram of an illustrative computer system operating in accordance with embodiments of the invention.

FIG. 4 depicts an illustrative computer system within which a set of instructions, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the methods of FIGS. 2 and 3, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "identifying", "generating", "returning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying, by a processor, a first history of changes to a program, the first history of changes including a version of the program identified as introducing an error and including a subsequent version of the program identified as fixing the error;
   generating, by the processor, a second history of changes to the program in view of the first history of changes, the second history of changes having a final version of the program that is identical to a final version of the program in the first history of changes, and wherein the second history of changes includes multiple additional versions represented in the first history of changes without including the version of the program identified as introducing the error; and
   generating, by the processor, a third history of changes to the program that comprises the first history of changes and the second history of changes.

2. The method of claim 1 further comprising:
   receiving a request for a history of changes to the program; and
   returning, in response to the request, at least one of the third history of changes or a reference to the third history of changes.

3. The method of claim 1 further comprising:
   receiving a request for a history of changes to the program; and
   returning, in response to the request, at least one of the second history of changes or a reference to the second history of changes.

4. The method of claim 1 further comprising:
   receiving a request that identifies a first version of the multiple additional versions of the program and that requests a version of the program that comes after the first version;
   identifying the first version of the program in the first history of changes; and
   returning, in response to the request, an identification of a second version of the program that comes after the first version in the first history of changes.

5. The method of claim 1 wherein the first history of changes and the second history of changes are identical prior to a first version of the multiple additional versions of the program, and wherein the method further comprises:
   receiving a request that identifies a second version of the program and that requests a version of the program that comes after the second version;
   identifying the second version of the program in the second history of changes; and
   returning, in response to the request, an identification of a third version of the program that comes after the second version in the second history of changes.

6. The method of claim 1 further comprising:
   receiving a request that identifies a first version of the multiple additional versions of the program and that requests a version of the program that precedes the first version;
   identifying the first version of the program in the second history of changes; and
   returning, in response to the request, an identification of a second version of the program that precedes the first version in the second history of changes.

7. The method of claim 1 wherein the second history of changes comprises, instead of the version of the program that introduces the error in the first history of changes, a second version of the program that is not in the first history of changes and that does not introduce an error that is fixed in a subsequent version of the program in the first history of changes.

8. An apparatus comprising:
   a memory to store a first history of changes to a program; and
   a processor operatively coupled to the memory, the processor to:
      identify a first history of changes to a program, the first history of changes including a version of the program identified as introducing an error and including a subsequent version of the program identified as fixing the error;
      generate a second history of changes to the program in view of the first history of changes, the second history of changes having a final version of the program that is identical to a final version of the program in the first history of changes, and wherein the second history of changes includes multiple additional versions represented in the first history of changes without including the version of the program identified as introducing the error; and
      generate a third history of changes to the program that comprises the first history of changes and the second history of changes.

9. The apparatus of claim 8 wherein the processor is further to:
   receive a request for a history of changes to the program; and
   return, in response to the request, at least one of the third history of changes or a reference to the third history of changes.

10. The apparatus of claim 8 wherein the processor is further to:
   receive a request for a history of changes to the program; and
   return, in response to the request, at least one of the second history of changes or a reference to the second history of changes.

11. The apparatus of claim 8 wherein the processor is further to:
   receive a request that identifies a first version of the multiple additional versions of the program and that requests a version of the program that comes after the first version;
   identify the first version of the program in the first history of changes; and
   return, in response to the request, an identification of a second version of the program that comes after the first version in the first history of changes.

12. The apparatus of claim 8 wherein the first history of changes and the second history of changes are identical prior to a first version of the multiple additional versions of the program, and wherein the processor is further to:

receive a request that identifies a second version of the program and that requests a version of the program that comes after the second version;

identify the second version of the program in the second history of changes; and return, in response to the request, an identification of a third version of the program that comes after the second version in the second history of changes.

13. The apparatus of claim 8 wherein the processor is further to:

receive a request that identifies a first version of the multiple additional versions of the program and that requests a version of the program that precedes the first version;

identify the first version of the program in the second history of changes; and return, in response to the request, an identification of a second version of the program that precedes the first version in the second history of changes.

14. The apparatus of claim 8 wherein the second history of changes comprises, instead of the version of the program that introduces the error in the first history of changes, a second version of the program that is not in the first history of changes and that does not introduce an error that is fixed in a subsequent version of the program in the first history of changes.

15. A non-transitory computer readable storage medium comprising instructions to cause a processor to:

identify, by the processor, a first history of changes to a program, the first history of changes including a version of the program identified as introducing an error and including a subsequent version of the program identified as fixing the error;

generate, by the processor, a second history of changes to the program in view of the first history of changes, the second history of changes having a final version of the program that is identical to a final version of the program in the first history of changes, and wherein the second history of changes includes multiple additional versions represented in the first history of changes without including the version of the program identified as introducing the error; and generate, by the processor, a third history of changes to the program that comprises the first history of changes and the second history of changes.

16. The non-transitory computer readable storage medium of claim 15, wherein the instructions further cause the processor to:

receive a request for a history of changes to the program; and returning, in response to the request, at least one of the third history of changes or a reference to the third history of changes.

17. The non-transitory computer readable storage medium of claim 15, wherein the instructions further cause the processor to:

receive a request for a history of changes to the program; and return, in response to the request, at least one of the second history of changes or a reference to the second history of changes.

18. The non-transitory computer readable storage medium of claim 15, wherein the instructions further cause the processor to:

receive a request that identifies a first version of the multiple additional versions of the program and that requests a version of the program that comes after the first version;

identify the first version of the program in the first history of changes; and return, in response to the request, an identification of a second version of the program that comes after the first version in the first history of changes.

19. The non-transitory computer readable storage medium of claim 15 wherein the first history of changes and the second history of changes are identical prior to a first version of the multiple additional versions of the program, and wherein the instructions further cause the processor to:

receive a request that identifies a second version of the program and that requests a version of the program that comes after the second version;

identify the second version of the program in the second history of changes; and return, in response to the request, an identification of a third version of the program that comes after the second version in the second history of changes.

20. The non-transitory computer readable storage medium of claim 15 wherein the second history of changes comprises, instead of the version of the program that introduces the error in the first history of changes, a second version of the program that is not in the first history of changes and that does not introduce an error that is fixed in a subsequent version of the program in the first history of changes.

* * * * *